(12) United States Patent
Sundell

(10) Patent No.: US 10,663,576 B2
(45) Date of Patent: May 26, 2020

(54) METHOD FOR CONTROLLING TRANSMISSION OF AN ELECTRONICALLY STEERABLE ANTENNA SYSTEM AND SUCH ELECTRONICALLY STEERABLE ANTENNA SYSTEM

(71) Applicant: SAAB AB, Linkoeping (SE)

(72) Inventor: Lars Sundell, Moelndal (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/092,382

(22) PCT Filed: Apr. 20, 2016

(86) PCT No.: PCT/SE2016/050344
§ 371 (c)(1),
(2) Date: Oct. 9, 2018

(87) PCT Pub. No.: WO2017/184041
PCT Pub. Date: Oct. 26, 2017

(65) Prior Publication Data
US 2019/0162840 A1  May 30, 2019

(51) Int. Cl.
*G01S 13/76* (2006.01)
*H01Q 3/36* (2006.01)
(Continued)

(52) U.S. Cl.
CPC ............ *G01S 13/762* (2013.01); *G01S 13/78* (2013.01); *G01S 13/781* (2013.01); *H01Q 1/28* (2013.01); *H01Q 3/36* (2013.01); *G01S 13/933* (2020.01)

(58) Field of Classification Search
CPC ...... G01S 13/762; G01S 13/781; G01S 13/78; G01S 13/933; H01Q 3/005; H01Q 3/36; H01Q 1/28
See application file for complete search history.

(56) References Cited

U.S. PATENT DOCUMENTS 3,683,374 A * 8/1972 Honold ................. G01S 13/762
  342/157
2006/0208944 A1 9/2006 Haskell
(Continued)

FOREIGN PATENT DOCUMENTS

JP    2013-156054    * 8/2013 ............. G01S 13/74

OTHER PUBLICATIONS

International Searching Authority, International Search Report and Written Opinion for International Application No. PCT/SE2016/050344, dated Jan. 20, 2017, 9 pages, Swedish Patent and Registration Office, Sweden.

*Primary Examiner* — Matthew M Barker
(74) *Attorney, Agent, or Firm* — Alston & Bird LLP

(57) ABSTRACT

A method is provided for controlling transmission of an electronically steerable antenna system, wherein the electronically steerable antenna system comprises a signal generator configured to generate electromagnetic waveforms, and an antenna. The electronically steerable antenna system is configured for transmitting at least interrogation signals and ISLS control signals, and the method comprises the steps of, when transmitting the ISLS control signals: generating an electromagnetic waveform; applying a first transmission phase offset to the electromagnetic waveform, wherein the first transmission phase offset determines the phase offset between each antenna column pair; applying a second transmission phase offset to each antenna column of the second antenna half, wherein the second transmission phase offset of the second antenna half offset is 180 degrees in relation to the first antenna half; and transmitting the generated electromagnetic waveform whereto the first and the second phase offsets have been applied.

16 Claims, 6 Drawing Sheets

(51) Int. Cl.
*H01Q 1/28* (2006.01)
*G01S 13/78* (2006.01)
*G01S 13/933* (2020.01)

(56) References Cited

U.S. PATENT DOCUMENTS

2007/0080886 A1    4/2007   Thomas et al.
2011/0102236 A1    5/2011   Wajer
2012/0068878 A1    3/2012   Billaud et al.
2015/0357711 A1   12/2015   Manasson et al.
2018/0372859 A1* 12/2018   Thomas ................ G01S 13/782

\* cited by examiner

METHOD FOR CONTROLLING TRANSMISSION OF AN ELECTRONICALLY STEERABLE ANTENNA SYSTEM AND SUCH ELECTRONICALLY STEERABLE ANTENNA SYSTEM

CROSS REFERENCE TO RELATED APPLICATIONS

This application is a National Stage Application, filed under 35 U.S.C. 371, of International Application No. PCT/SE2016/050344, filed Apr. 20, 2016; the contents of which as are hereby incorporated by reference in their entirety.

BACKGROUND

Related Field

The present invention relates to a method for controlling transmission of an electronically steerable antenna system, particularly for controlling transmission of an electronically steerable antenna system at transmission of a control signal such as an ISLS control signal. The present invention also relates to an electronically steerable antenna system capable of executing the herein disclosed method.

Description of Related Art

In order for e.g. military airborne units such as aircrafts to be able to identify themselves and provide other requested information systems commonly referred to as IFF systems, Identify Friend or Foe, are used. Corresponding civilian applications are generally referred to as SSR systems, Secondary Surveillance Radar. Herein such systems are simply generally referred to as identification systems.

Increased use of electronically scanned array antennas, generally referred to as PESA (Passive Electronically Scanned Array) or AESA (Active Electronically Scanned Array), and herein referred to as electronically steerable antenna systems, implies new challenges e.g. in terms of how to provide IFF/SSR functionality, generally without the presence of a mechanically rotated antenna.

Electronically steerable antenna systems comprise numerous transmit and/or receive elements, wherein each element is configured to transmit and/or receive separate electromagnetic waves of the radio frequency spectrum, also referred to as RF signals. RF signals are herein also referred to as just signals. The RF signals, thus the electromagnetic waveforms, can generally be controlled in phase, amplitude, frequency and/or time. For PESA systems the antenna elements are fed with a centrally amplified signal wherein for AESA systems each antenna element is provided with an individual power amplifier generally arranged together with a phase shifter. This will be explained more in detail later on.

The antenna elements together form an array of elements, referred to as an antenna array. The antenna array is generally defined by a number of columns in which the antenna elements are arranged, herein referred to as antenna columns, and a number of rows, in which the antenna elements are arranged, herein referred to as antenna rows. During transmission each antenna element may transmit a separate electromagnetic wave. For a pulsed radar, unlike a continuous wave radar, the antenna elements transmit simultaneously, forming a transmission pulse (which herein also may be referred to as a signal).

The power of the radiated electromagnetic waves, thus the energy radiated, in elevation and azimuth direction generates what is referred to as, and generally visualized as, an antenna pattern. The electromagnetic waves transmitted by the individual antenna elements of an antenna array interfere constructively at certain angles in front of the antenna and form the antenna radiation pattern. The main lobe points in the direction where the antenna radiates maximum energy and defines the main radiation direction of the antenna. The antenna pattern, also referred to as radiation pattern or far-field pattern, thus refers to and visualizes the angular directional dependency of the strength of the electromagnetic waves transmitted by the antenna. Besides the main lobe, directed transmission of an antenna inevitably produces local maxima of a far field radiation pattern referred to as side lobes and, for lobes pointing essentially 180 degrees from the direction of the main lobe, back lobes.

For an electronically steerable antenna the direction in which the antenna points or is directed, thus the direction in which the antenna radiates maximum energy, can be controlled by controlling the phase of the transmitted electromagnetic waves of the individual antenna elements. This is generally referred to as the scan angle of the antenna. This is generally accomplished by means of phase shifters controlling the phase of respective antenna element. The power density of the side lobes is generally much less than of the main lobe. Excessive side lobe radiation wastes energy and may cause interference. Thus, it is desirable that as much as possible of the available energy is forming the main lobe and that the energy radiated as side lobes is kept to a minimum. The level of the side lobes are generally measured in dB in relation to the main lobe, or as a ratio in relation to the main lobe.

The antenna elements transmitting and receiving signals or electromagnetic waves may be the same antenna elements, wherein a decoupler, switch, circulator or similar is used to control if the antenna is in transmission or receiving mode, or be separate antenna elements used only for either transmission or reception.

During transmission all the antenna elements may be fed in phase in the current pointing direction, which is referred to as transmission in sum channel, or be fed with different phases. E.g. one half of the antenna may transmit electromagnetic waves which are essentially 180 degree out of phase of the electromagnetic waves transmitted by the other half of the antenna. This is referred to as transmission in delta, or difference, channel.

Please note that also the pointing direction of an electronically steerable antenna, if not being controlled by time delay, may be determined by the phase.

Antenna systems used as IFF/SSR antenna systems are generally also configured for transmitting control signals via a control channel, giving rise to control signal antenna patterns. Conventionally such control signals have been transmitted by a separate omnidirectional antenna, wherein the control signal antenna pattern may be omnidirectional.

Control signals may also be transmitted by applying the same antenna as is used to transmit via the sum and delta channel, and then the control signal is generally transmitted via the delta channel.

The basic principle behind the communication protocol system used for providing the identification functionality is based on a system developed during the Second World War, which continuously has been further developed ever since. The functionality of the identification systems used are regulated in e.g. the civilian ICAO standard and the military NATO standard STANAG 4193.

The functionality of identification systems is that a signal processing device of an interrogating unit generates a signal which subsequently is transmitted by means of an antenna. This is generally referred to as transmission of an interrogation signal. The interrogating unit may e.g. be an aircraft, a ground based vehicle or similar. The interrogation signal comprises information regarding what type of information that is requested from a receiving unit. A transponder unit at a receiving unit, wherein the receiving unit also may be e.g. an aircraft or similar, may e.g. be requested to identify itself or to inform the interrogating unit of current barometric altitude or speed. The transponder unit of the receiving unit receives the transmitted interrogation signal and replies with a coded reply signal comprising the requested information. The reply signal is received by the interrogating unit and is subsequently decoded and processed by the signal processing device, or other calculating means configured to process the received information.

During operation of an identification system it is preferred that only transponders of aircrafts or similar which are present within the current pointing direction of the antenna, thus transponders which are present within the current pointing direction of the main lobe of the antenna pattern of the interrogation signal, are triggered or at least that such transponders can be separated from transponders triggered by a side lobe of the interrogation signal. However, if the side lobes of the interrogation signal antenna pattern are sufficiently strong it is also possible that transponders of aircrafts or similar which are present within such side lobes unintentionally are triggered. In order to avoid that transponders outside of the main lobe of the interrogation signal antenna pattern are triggered, or at least to be able to separate triggering by side lobes, a control signal in form of an ISLS, Interrogator Side Lobe Suppression, signal, having a control signal antenna pattern, shall, according at least to some prevailing standards, also be transmitted. ISLS control signals are employed to suppress transponder replies from the side lobes of the interrogation signal antenna pattern or to at least be able to identify such replies.

Generally, the transponders of the units requested e.g. to identify themselves are configured for receiving the transmitted ISLS control signal and, preferably by means of amplitude comparison in regards to previously and/or subsequently received signals, determine whether the received interrogation signal is derived from the main lobe of the interrogation signal or from a side lobe. The determination of whether the received interrogation signal is derived from a valid main lobe may be performed by looking at the difference in signal strength, measured in dB relative the maximum level of the main lobe, between the interrogation signal and the ISLS control signal. E.g., according to the STANAG 4193 and ICAO standards, it is regulated that the ISLS control signal antenna pattern is configured to be, at all angles of elevation, 9 dB, or more, below the interrogation signal antenna pattern in the direction of the main lobe of the antenna and equal to, or greater than, the interrogation signal antenna pattern within the desired directions of suppression of the side lobes of the interrogation signal antenna pattern. Thus, it is preferable that the antenna pattern of the ISLS control signal has as distinct minima or nullification point in the direction of the main lobe of the interrogation signal. The desired directions of side lobe suppression are the directions wherein the level of the interrogation signal side lobes is not at least 40 dB below the peak of the interrogation signal main lobe.

There are several modes that can be used for identification or interrogation, herein referred to interrogation modes. Different modes may be characterized in different ways and by different characteristics, and e.g. modes A and C may be characterized by the difference in time between two sequentially transmitted signals. Thus, when herein referring to interrogation signal what is referred to is actually the sequence of signals together forming a request for information in accordance to current operation mode. Generally, as previously mentioned, when herein referring to signal what is referred to is an electromagnetic wave, also referred to as a RF signal (Radio Frequency), configured to carry information and being transmitted from or received by an antenna system.

Traditionally, mode A, used for identification of the identity code of the aircraft, and mode C, used for indicating the altitude of the aircraft, have been the two far most commonly used operation modes. However, for most parts of the world, during the last decades mode S, or mode Select, has emerged as a commonly used operation mode and today essentially all aircrafts have to be provided with a transponder capable of responding to a mode S interrogation signal, and essentially all transponders have to be compatible with mode S in order to fulfil prevailing standards. Mode S includes a more robust communication protocol and enables a wider range of information exchange. The major advantage of mode S is the ability to interrogate a single aircraft at a time.

Unlike e.g. mode A and mode C, when operating in mode S transmission in the sum channel and in the delta channel, which for this particular purpose is used as to transmit a control signal, has to be performed simultaneously. If not a separate antenna is used for transmission in the control channel, transmission via the sum channel and transmission via the delta channel generally is performed by means of the same antenna. The antenna including phase shifters, amplifiers etc. are preferably configured to operate at maximum efficiency when transmitting via either the sum channel or via the delta channel, not for when transmitting via the sum and delta channels simultaneously. Thus, simultaneous transmission at operation in mode S may be problematic.

As is apparent for a person skilled in the art, when herein referring to maximum power level and maximum power efficiency what is referred to is, given all trade offs and deliberate limitations of power levels and efficiency levels due to e.g. cost, an elevated power level and efficiency level in relation other levels referred to. Thus, the word maximum is not to be interpreted as ideal maximum but as an elevated level in relation to other levels referred to.

Conventionally when non-electronically steerable antenna systems comprising antenna systems are used for identification the transmission of the ISLS control signal is achieved by tapering, which means that the amplitude of the interrogation signal antenna pattern is configured such that the signal strengths of the side lobes are lowered. However, this approach entails significant losses in terms of efficiency and range if implemented for an electronically steerable antenna configuration of the antenna transmitting the ISLS control signal.

Thus, there is a need for further improvement.

This is a very simplified description of the operations of antenna systems and the basic principles of identification functionality, but still sufficiently detailed to establish that there is room for further improvements.

BRIEF SUMMARY

An object of the present invention is to provide a control method overcoming, or at least alleviating, the commonly known problems, particularly by generating an ISLS control signal without having to add additional components or degrading the effective radiated power by applying tapering. Such a control method is defined by an independent claim. A further object is to provide an electronically steerable antenna system configured for executing such a control method. Such electronically steerable antenna system is also defined in an independent claim. Further advantageous embodiments of control methods and electronically steerable antenna systems are defined in the dependent claims. The present invention may be applied for both military and civilian applications.

Generally, ISLS control signals are transmitted in order to be able to detect whether a unit requested to e.g. identify itself by responding to an interrogation signal is present within the main lobe of an antenna pattern or within a side lobe. In order for a non-electronically steerable antenna systems to be able to transmit an ISLS control signal fulfilling existing standards generally either a separate control antenna is required or transmission of the ISLS control signal is achieved by tapering, resulting in significant loss in terms of efficiency.

The present invention refers to a method of controlling an electronically steerable antenna system. The method is executed by a computer device, wherein such computer device may be a computer, a control unit or any other device capable of executing and controlling the operation of a antenna system. The antenna system comprises a signal generator configured to generate electromagnetic waveforms and an antenna. The antenna comprises an even number of antenna columns symmetrically arranged about a centerline of the antenna. Thereby a first and a second symmetrical antenna half are formed, separated by the centerline. One antenna column from the first antenna half and one antenna half of the second antenna half together form an antenna column pair. The antenna columns of an antenna column pair are mutually equally distanced from the centerline of the antenna. Respective antenna column comprises at least one antenna element configured at least for transmitting electromagnetic waves. The electronically steerable antenna system is configured for transmitting at least one interrogation signal, providing an interrogation signal antenna pattern, and at least one ISLS control signal, providing an ISLS control signal antenna pattern. The number and sequence of RF signals transmitted is dependent on current transmission mode. During certain transmission modes, such as mode S, the interrogation signal and the ISLS control signal are transmitted simultaneously. The method of the present invention comprises the method steps of, when transmitting the ISLS control signal:

generating an electromagnetic waveform, wherein the electromagnetic waveform is generated by the signal generator, and distributing the generated electromagnetic waveform to the antenna elements of the antenna columns, wherein the antenna columns form antenna column pairs, wherein the antenna column pairs are formed by one antenna column from the first antenna half and one antenna column of the second antenna half, wherein the antenna columns of an antenna column pair are equally distanced from the centerline of the antenna, wherein during distribution of the generated electromagnetic waveform to the antenna elements the method further comprises the method steps of applying a first transmission phase offset to the electromagnetic waveform distributed to the antenna elements of each antenna column pair, wherein the first transmission phase offset determines the transmission phase offset between the antenna elements of each antenna column pair, applying a second transmission phase offset to each antenna column of the second antenna half, wherein the second transmission phase offset of the second antenna half offset is 180 degrees in relation to the first antenna half, and transmitting the generated electromagnetic waveform whereto the first and the second phase offsets have been applied.

By applying the first and second transmission phase offsets to the generated electromagnetic waveform the electronically steerable antenna is able to transmit an ISLS control signal fulfilling prevailing standards without having to lower, or in any other way reduce or deteriorate, the transmission efficiency of the antenna. Thus, with a properly selected phase offset an ISLS control signal can be created that has characteristics and an antenna pattern that satisfies prevailing standards. This is done without using an additional antenna or without having to apply tapering.

To give an example: Consider an electronically steerable antenna system comprising six antenna columns, comprising at least one antenna element each, 1 to 6, having a phase A determining by the current pointing direction of the electronically steerable antenna. The first transmission phase offset is calculated to be, for respective antenna column pair: alfa, beta and delta. The second transmission phase offset is 180 degrees offset between the first (antenna column 1 to 3) and the second (antenna column 4 to 6) antenna half.

This would give the following phase diagram:

| For the first antenna half: | For the second antenna half: |
|---|---|
| 1: A+alfa - 2: A+beta - 3: A+delta | 4: A+delta+180 - 5: A+beta+180 - 6: A+alfa+180 |

In the example described above may A be defined by:

$$A(x(k),\Theta(c))=(2\pi/\lambda)*x(k)*\sin(\Theta(c)),$$

wherein x(k)=the position of the antenna element number k, Θ(c)=scan angle (in realtion to the normal of the antenna, thus the direction perpendicular to the extension of the antenna), and λ=c/f, wherein c is the speed of light in vacuum and f is the frequency of the carrier wave, which e.g. may be 1030 MHz.

According to one exemplary aspect of the present invention the antenna columns are at least four in number, wherein each antenna half comprises two antenna columns with, at least, one antenna element each. Electronically steerable antenna systems comprising four antenna columns are e.g. advantageous for implementation in fighter aircrafts since the available space for arranging an antenna system e.g. in the nose cone of the fighter aircraft is limited. For the separation of the antenna columns generally apply that if they are arranged close to each other this gives a wide main lobe and less gain. If the distances between the antenna columns are increased, up to a certain level, this will narrow down the main lobe of the antenna and the gain will increase. If the distance between the antenna columns are too wide grating lobes will be generated. At an antenna column distance of lambda/2, in theory, the electronically steerable antenna can be directed +/−90 degrees without forming grating lobes.

According to another exemplary aspect of the present invention the method further comprises the method steps of:
calculating the first transmission phase offset, wherein the first transmission phase offset is calculated by:
maximizing the ratio in effective radiated power between the effective radiated power of a transmitted ISLS control signal and the effective radiated power of a transmitted interrogation signal in the directions of the side lobes.

The difference in ratio between effective radiated power of the interrogation signal and effective radiated power of the ISLS control signal will be the smallest in the directions of the side lobes. Thus maximizing the ratio in effective radiated power between the effective radiated power of a transmitted ISLS control signal and the effective radiated power of a transmitted interrogation signal in the directions of the side lobes is equal to that the difference between the effective radiated power of a transmitted ISLS control signal and the effective radiated power of a transmitted interrogation signal is maximized in the direction where the difference is the smallest. The optimization calculation may be performed by a number of commonly known mathematical optimization methods such as e.g. by means of approximation and iteration.

The offsets of the transmission phase of the electromagnetic waves transmitted from respective antenna element are obtainable in a number of ways of which two will be disclosed more in detail below.

The generated electromagnetic waveform forming the various signals transmitted are fed from the signal generator to respective phase shifter, amplifier or similar of respective antenna column via a distribution network. According to an exemplary aspect of the present invention the electromagnetic waveforms generated by the signal generator are additionally distributed to the antenna columns via an electromagnetic phase control distribution network, and wherein the previously disclosed method steps of
applying a first transmission phase offset to the electromagnetic waveform distributed to the antenna elements of each antenna column pair, wherein the first transmission phase offset determines the phase offset between each antenna column pair, and
applying a second transmission phase offset to each antenna column of the second antenna half, wherein the second transmission phase offset of the second antenna half offset is 180 degrees in relation to the first antenna half,
are obtained by means of
configuring the electromagnetic phase control distribution network such that the first and second transmission phase offsets are obtained. Configuring the electromagnetic phase control distribution network in accordance to the desired fix phase offset has the exemplary advantage that no electronic control is required to obtain the desired transmission phase offset.

The phase of an electromagnetic waveform fed via a conductive line is dependent on the configuration of the conductive line. Conductive line is herein defined as any conductive connection capable of conducting an electromagnetic waveform such as e.g. a wire conductor, a stripline conductor or similar. Various properties such as e.g. the length of conductive lines in form of wire conductors, the material used in the conductive line or for insulation of the conductive line, as well as adding a phase influencing component to the conductive line, influences the phase of an electromagnetic waveform fed via such a wire conductor. Thus, the phase of the an electromagnetic wave form can be controlled by selecting or configuring different signal phase paths, and according to aspects of the present invention this can be used in order to determine the transmission phase of a signal transmitted by means of the distribution network.

Thus, according to one advantageous aspect of the present invention respective electromagnetic phase control distribution network comprises a number of conductive lines wherein the configuration of the electromagnetic phase control distribution network is obtained by configuring the properties of the conductive lines, such that the first and second transmission phase offsets are obtained.

Configuring the properties, such as length of wire conductors, the material used in the conductive line or for insulation of the conductive line etc. of the electromagnetic phase control distribution network is a convenient way for obtaining a desired fix phase offset for the antenna elements of an antenna column. Using the configuration of conductive lines to influence the phase, thus the configuration, of an electromagnetic waveform fed via a distribution network is an efficient, and cost effective, way of controlling the resulting phase of an electromagnetic waveform. Controlling the phase of an electromagnetic waveform can be used in order to obtain desirable signal characteristics of the transmitted electromagnetic waveform, in addition to using the phase shifters to control the scan angle, thus the pointing direction of the main lobe, of the electronically steerable antenna.

Thus, according to another exemplary aspect of the present invention respective antenna element is provided with a phase shifter configured to control the phase of at least transmitted electromagnetic waves of respective antenna element, and wherein the previously disclosed method steps of
applying a first transmission phase offset to the electromagnetic waveform distributed to the antenna elements of each antenna column pair, wherein the first transmission phase offset determines the phase offset between each antenna column pair, and
applying a second transmission phase offset to each antenna column of the second antenna half, wherein the second transmission phase offset of the second antenna half offset is 180 degrees in relation to the first antenna half,
are obtained by the further method steps of:
configuring the phase shifters of the antenna elements of the antenna columns such that the first and second transmission phase offsets are obtained.

Utilizing the phase shifters, which all electronically steerable antenna systems are provided with, in order to apply the first and second phase offset when transmitting the ISLS control signal has the advantage that no additional components are required and that the only additional operation that has to be performed is that, in addition to setting the phase of respective antenna element for controlling the direction of the antenna main lobe, the first and second phase offsets are added. As will be discussed more in detail in the detailed description, this exemplary aspect requires that at least each antenna column, or preferably each antenna element of each antenna column, is provided with an individual phase shifter, which generally is the case for electronically steerable antenna systems. The phase shifters are generally controlled by a control unit or similar.

Within the scope of the present invention are also aspects of electronically steerable antenna systems suitable for executing aspects of methods of controlling an electronically steerable antenna system.

Thus, an exemplary aspect of the present invention refers to an electronically steerable antenna system comprising a signal generator configured to generate electromagnetic waveforms, and an antenna, in turn comprising an even number of antenna columns symmetrically arranged about a centerline of the antenna and thereby forming two symmetrical antenna halves, wherein respective antenna column comprises at least one antenna element configured at least for transmitting electromagnetic waves, and wherein the electronically steerable antenna system is configured for executing any of the previous disclosed aspects of methods, and is thereby able to transmit an ISLS control signal without degrading efficiency or range.

According to an aspect of the present invention of an electronically steerable antenna system the electronically steerable antenna system comprises at least four antenna columns. Four antenna columns, each comprising at least one antenna element, is the simplest antenna configuration that the herein disclosed method may be executed by. The more antenna columns and/or antenna elements the electronically steerable antenna system comprises, provided that the distance between the antenna columns and/or antenna elements is constant, and at least to a certain level, the higher is the directivity of the antenna system and the higher may the transmitting power be. According to yet an aspect of the present invention of an electronically steerable antenna system each antenna column comprises a number of antenna elements, and wherein all antenna elements of one antenna column are configured for transmitting electromagnetic waves with the same transmitting phase.

The present invention further relates to a computer program comprising program code means for performing the method steps of any aspect, or a combination of aspects, of methods for controlling an electronically steerable antenna system, when the computer program is run on a computer device, a computer readable medium carrying such a computer program and a control unit configured to perform such method steps.

The terminology used herein is for the purpose of describing particular exemplary aspects or embodiments only and is not intended to be limiting of the invention. As used herein, the singular forms "a", "an" and "the" are intended to include the plural forms as well, unless the context clearly indicates otherwise. It should further be understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention belongs. It should further be understood that terms used herein should be interpreted as having a meaning that is consistent with their meaning in the context of this specification and the relevant art and will not be interpreted in an idealized or overly formal sense unless expressly so defined herein.

The foregoing has described the principles, preferred examples and modes of operation of the present invention. However, the invention should be regarded as illustrative rather than restrictive, and not as being limited to the particular examples discussed above. The different features of the various examples of the invention can be combined in other combinations than those explicitly described, unless the context clearly indicates otherwise.

BRIEF DESCRIPTION OF THE FIGURES

With reference to the appended drawings, below follows a more detailed description of embodiments of the invention cited as examples.

DETAILED DESCRIPTION OF VARIOUS EMBODIMENTS

The following description of exemplary embodiment is for illustration purposes only and should not be interpreted as limiting for the invention. All examples herein should be seen as part of the general description and are therefore possible to combine if not something else is explicitly or implicitly indicated. Individual features of the various embodiments and methods may be combined or exchanged unless such combination or exchange is clearly contradictory to the overall function of the embodiment or feature. Reoccurring reference signs refer to corresponding elements throughout the detailed description.

Figure 1:
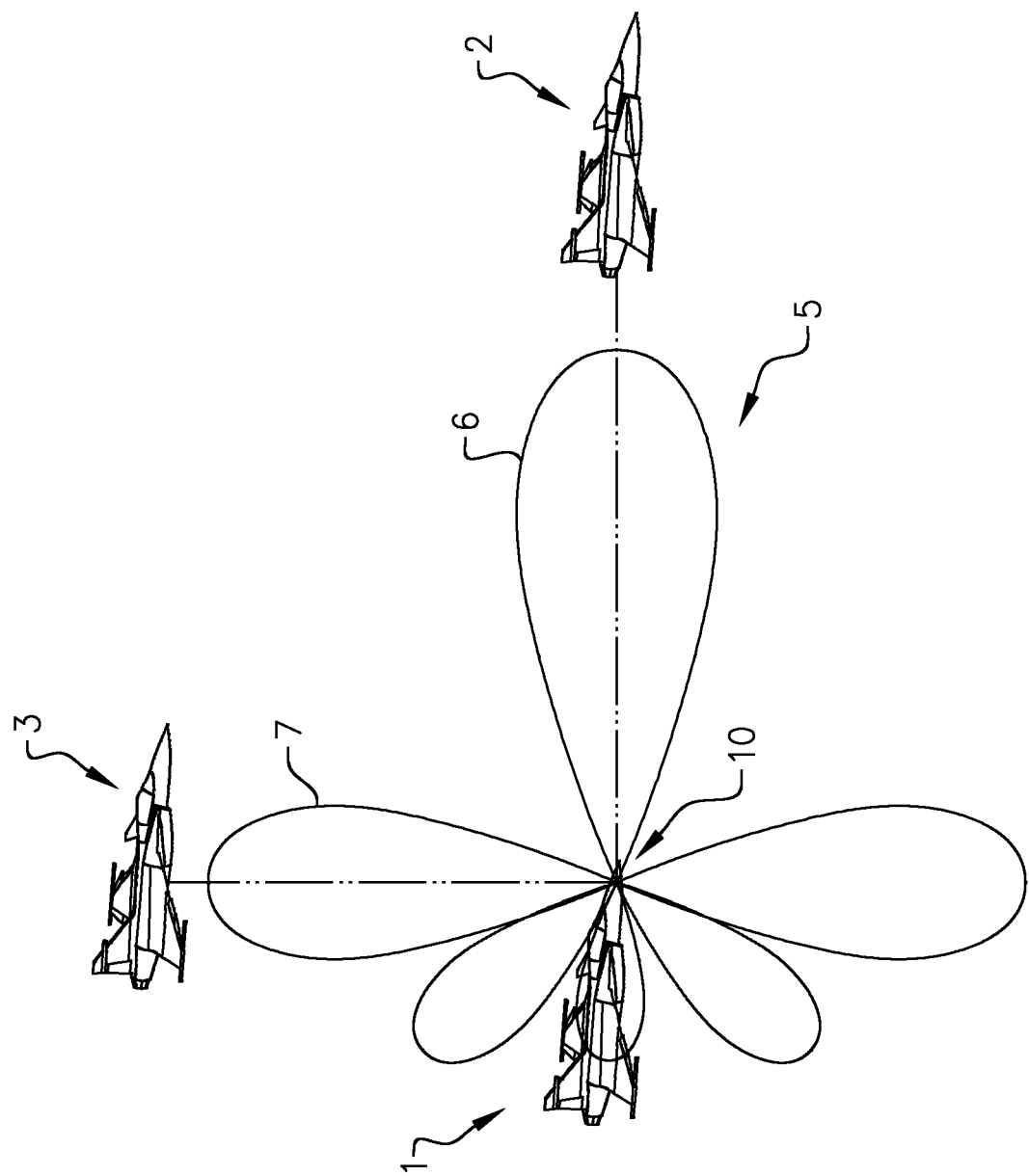
FIG. 1 discloses a schematic aircraft provided with an exemplary embodiment of an electronically steerable antenna system according to an aspect of the present invention, FIG. 2a discloses a schematic view of a first embodiment of an electronically steerable antenna system, FIG. 2b discloses a schematic view of a second embodiment of an electronically steerable antenna system, FIG. 2c discloses a schematic view of a third embodiment of an electronically steerable antenna system, FIG. 2d discloses a schematic view of a fourth embodiment of an electronically steerable antenna system, FIG. 2e discloses a schematic view of a fifth embodiment of an electronically steerable antenna system, and FIG. 3 discloses a schematic antenna diagram.

FIG. 1 discloses a first aircraft 1, provided with an exemplary embodiment of an electronically steerable antenna system 10 according to the present invention. The electronically steerable antenna system 10 may e.g. be configured to transmit a challenge or interrogation signal. The angular propagation of the transmitted energy in the far field from an antenna is generally referred to, and schematically shown as, an antenna pattern. An antenna pattern 5 of an interrogation signal transmitted by the first aircraft 1 is schematically disclosed in FIG. 1. Further, FIG. 1 discloses a second aircraft 2 and a third aircraft 3, wherein the second aircraft 2 is present in the direction of a main lobe 6 and the third aircraft 3 is present in the direction of a side lobe 7 of the interrogation signal antenna pattern 5.

The interrogation signal preferably comprises information regarding what information that is requested from, in the exemplary embodiment of FIG. 1, the second aircraft 2. The second aircraft 2 may e.g. be requested to identify itself or provide information concerning current barometric altitude. A transponder of the second aircraft 2 receives the interrogation signal, wherein the transponder is triggered to respond with a coded reply signal comprising the requested information. The reply signal is received and decoded by the first aircraft 1.

When transmitting an interrogation signal it is first and foremost important that transponders of e.g. aircrafts in the pointing direction of the antenna system 10, thus in the direction of the main lobe 6, responds. This is hereinafter referred to as true responses. If responses also are provided by aircrafts or similar not in the pointing direction it is important that such responses, hereinafter referred to as false responses, can be separated from the true responses. In order to ensure that the transponder of the second aircrafts 2, which currently is in the pointing direction of the electronically steerable antenna system 10, is triggered, and that a true response from the second aircraft 2 can be separated from possibly false responses from the third aircraft 3, transmission of an ISLS control signal is applied.

The requirement of transmission of ISLS control signals are regulated by prevailing standards such as e.g. STANAG 4193 or ICAO. Such standards define the characteristics of control signals whereby it is possible for an interrogated unit to, by comparing a received interrogation signal with a subsequently received control signal, detect whether the interrogated unit is present within the direction of a main lobe or a side lobe of an interrogation signal antenna pattern.

By referring to the exemplary embodiment of FIG. 1, and assuming the STANAG 4193 or ICAO standards is applied, by measuring the relative signal strengths of the interrogation signal and the subsequently transmitted ISLS control signal, and preferably only responding to the interrogation signal if the interrogation signal is at least 9 dB stronger than the ISLS control signal, the transponders of the second and third aircrafts 2, 3 may detect whether to respond to the interrogation signal or not. Generally, a transponder must respond if the interrogation signal is 9 dB higher than the subsequently transmitted ISLS control signal, may respond if the interrogation signal is between 0 and 9 dB higher than the subsequently transmitted ISLS control signal and is not allowed to respond if the subsequently transmitted ISLS control signal is stronger than the preceding signal.

Avoiding unwanted triggering of transponders of aircrafts or similar outside of the pointing direction, thus within the pointing direction of the side lobes of the interrogation signal antenna pattern, or at least being able to clearly identify which triggering that is due to side lobe triggering, of the electronically steerable antenna system is highly important in order for the IFF/SSR system to be robust and reliable. Hence, it is very important that the transmitted ISLS control signals complies with prevailing standards. Traditionally the ISLS control signal has been transmitted by a separate antenna, which obviously adds e.g. cost and complexity to such antenna system, or is transmitted with efficiency reducing tapering.

Please note that there are also other standards, such as e.g. AIMS, which identification functionality can be operated according to.

Figure 2A:
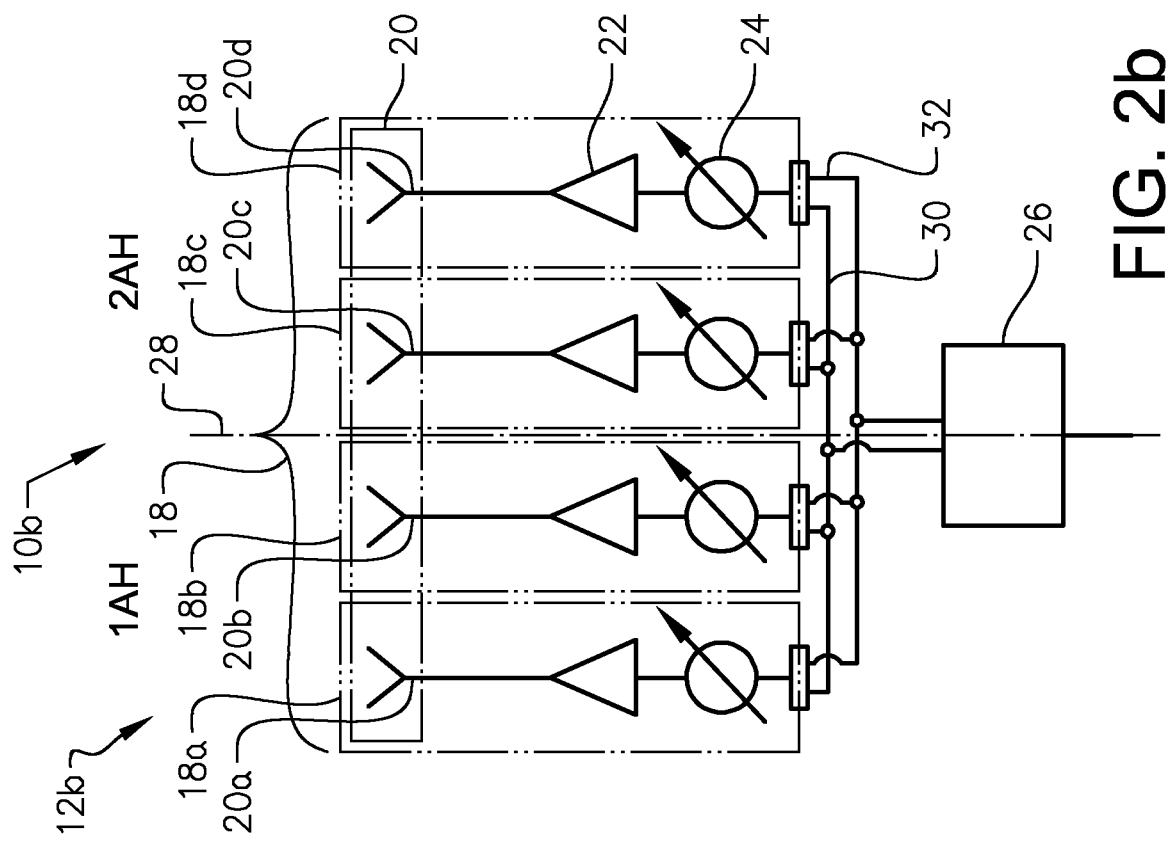

FIG. 2a discloses a schematic view of a first exemplary embodiment of an electronically steerable antenna system 10a. According to the first exemplary embodiment disclosed in FIG. 2a the electronically steerable antenna system comprises an antenna 12a in turn comprising four antenna columns 18 (18a, 18b, 18c, 18d) comprising four antenna elements 20 (20a, 20b, 20c, 20d), one each, wherein each antenna element 20a, 20b, 20c, 20d is provided with an amplifier 22 and a phase shifter 24. The amplifiers 22 are configured for, at transmission, amplify a generated signal, in order to increase the signal strength, and the phase sifter 24 is configured for, at transmission, control the phase of the outgoing signal. By controlling the phase at which respective antenna elements transmits it is possible to control the pointing direction of the electronically steerable antenna system 10a. The antenna elements 20 are configured at least for transmitting electromagnetic waves. The electromagnetic waves are generated by a schematically disclosed signal generator 26.

When transmitted simultaneously the electromagnetic waves transmitted by the antenna elements 20a, 20b, 20c, 20d interfere constructively at certain angles in front of the antenna wherein a number of antenna lobes, including a main lobe, is formed. By controlling the phase at which respective antenna element 20a, 20b, 20c, 20d transmits respective electromagnetic wave e.g. the direction, propagation and spread of the antenna lobes, including the main lobe, can be controlled. By controlling the phase the angles at which the electromagnetic waves will interfere constructively can be controlled.

The antenna 12a is symmetrically divided by a centerline 28 in a first antenna half 1AH and a second antenna half 2AH, wherein antenna columns 18a and 18b, and thus respective antenna element 20a and 20b, belongs to the first antenna half 1AH and the antenna columns 18c and 18d, and thus antenna elements 20c and 20d, belongs to the second antenna half 2AH. One antenna column 18a, 18b of the first antenna half 1AH form an antenna column pair with one antenna column 18c, 18d of the second antenna half 2AH. According to the exemplary embodiment of FIG. 2a antenna columns 18a and 18d are mutually equally located in respect to the centerline 28 of the antenna 12a and form a first antenna column pair 18a-18d. Correspondingly, antenna columns 18b and 18c are mutually equally located in respect to the centerline 28 of the antenna 12a and form a second antenna column pair 18b-18c.

In the embodiment of the electronically steerable antenna system 10a disclosed in FIG. 2a the electromagnetic waveforms generated by the signal generator 26 are fed from the signal generator 26 to respective antenna column 18a, 18b, 18c, 18d, to the respective phase shifter 24 of respective antenna column 18a, 18b, 18c, 18d, via a distribution network 30.

The electronically steerable antenna system 10a may be used solely for transmission or for transmission and reception. As is apparent for a person skilled in the art, if the electronically steerable antenna system 10a is used for transmission and reception a decoupler, or other device with corresponding functionality, may be used in order to be able to separate a transmission mode from a reception mode. Further, as also is apparent for a person skilled in the art the antenna system 10a may comprise and/or may be configured to be combined with or connected to a number of additional components such as filters, further amplifiers, circulators etc. However, since this is not part of the present invention per se nor is essential in order to sufficiently disclose the present invention possible alternative system designs, including various components, will not be discussed in detail herein. Obvious design and configuration variations of the present invention are considered to be within the scope of the present invention.

According to the method of the present invention a first transmission phase offset is calculated by maximizing the ratio in effective radiated power between the effective radiated power of a transmitted ISLS control signal and the effective radiated power of a transmitted interrogation signal at the direction of the side lobes of the antenna pattern of the interrogation signal.

By using the phase shifters 24 to 1: phase shift transmission of respective antenna column pair 18b-18c and 18a-18d according to the calculated first transmission phase offset, and 2: phase shift transmission by the antenna elements 20c, 20d of the second antenna half 2AH to be 180 degrees out of phase, which is referred to as a second transmission phase offset, of transmission by the antenna elements 20a, 20b of the first antenna half 1AH, an ISLS control signal can be created. The method of the present invention enables an ISLS control signal to be transmitted by using the electronically steerable antenna used for transmitting the interrogation signal, thus without the need of a separate antenna solely for transmitting the ISLS control signal, and also the ISLS control signal can be transmitted without efficiency reducing tapering.

I simple terms, with a properly selected phase offset an ISLS control signal can be created that disclose an antenna pattern that satisfies prevailing standards. This is done without using an additional antenna or without having to apply tapering.

Figure 2B:
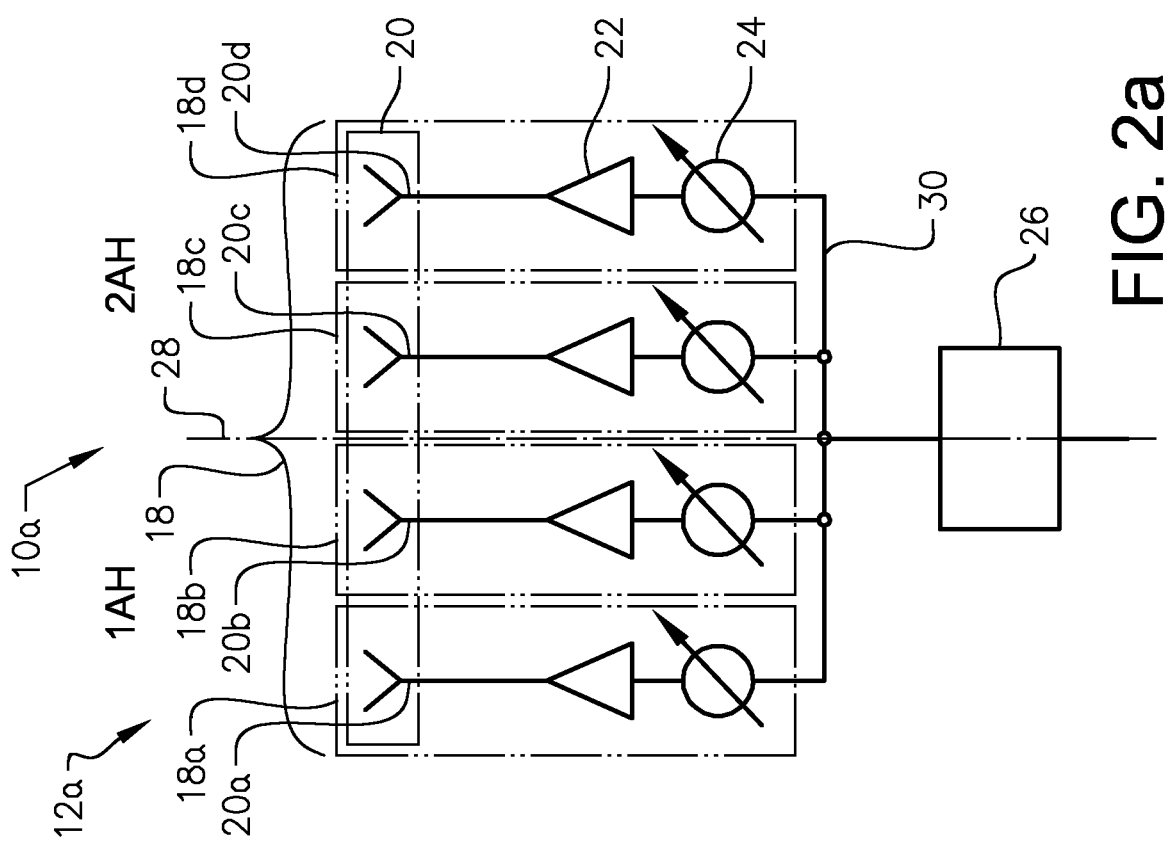

FIG. 2b discloses a schematic view of a second exemplary embodiment of an electronically steerable antenna system 10b. According to the second exemplary embodiment disclosed in FIG. 2b the steerable antenna system 10b comprises an antenna 12b also comprising four antenna columns 18 (18a, 18b, 18c, 18d) with four antenna elements 20 (20a, 20b, 20c, 20d).

In the exemplary embodiment disclosed in FIG. 2b the electronically steerable antenna system 10b, in addition to the distribution network 30, also comprises a phase control distribution network 32.

Properties such as length, material, material used for insulation, presence of additional components etc. of a distribution network consisting of conductive lines such as e.g. wire conductors, stripline conductors or similar, may be used to control e.g. the phase of a signal to be transmitted which is fed to the antenna elements via such distribution network. Thus, by configuring the properties of the conductive lines of a phase control distribution network of antenna elements it is possible to control the transmission phase of a signal transmitted by such antenna elements.

The phase control distribution network 32 is configured such that a signal fed via the phase control distribution network 32 is applied with the first and second transmission phase offsets. Thereby, by feeding a generated signal via the phase control distribution network 32 to the antenna elements 20a, 20b, 20c, 20d for transmission an ISLS control signal can be formed.

The distribution network 30 and the phase control distribution network 32 are combined in a combiner 33. Such combiner 33 may be any of the various possible components providing the functionality of combining at least two signals such as e.g. a 180 degrees hybrid coupler or a circulator.

In the exemplary embodiment of FIG. 2a phase shifters 24 are used for obtaining the first and second transmission phase offset. In the exemplary embodiment of FIG. 2b the phase control distribution network 32 is applied for obtaining the first and second transmission phase offset.

Thus, with a properly selected phase offset an ISLS control signal can be created that has an antenna pattern that satisfies prevailing standards. This is done without using an additional antenna, without having to apply tapering, or without using the phase shifters 24.

Figure 2C:
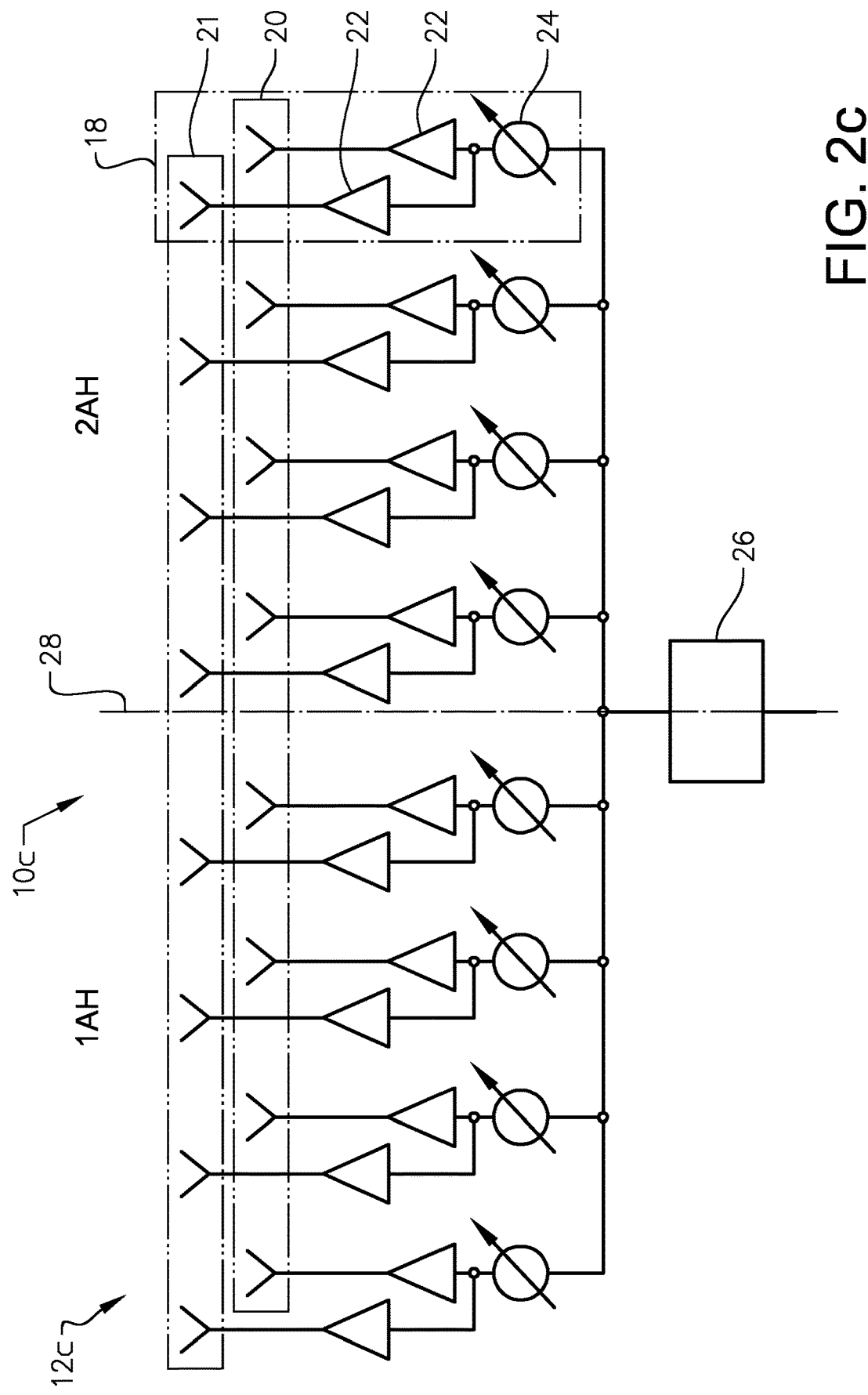
Figure 2D:
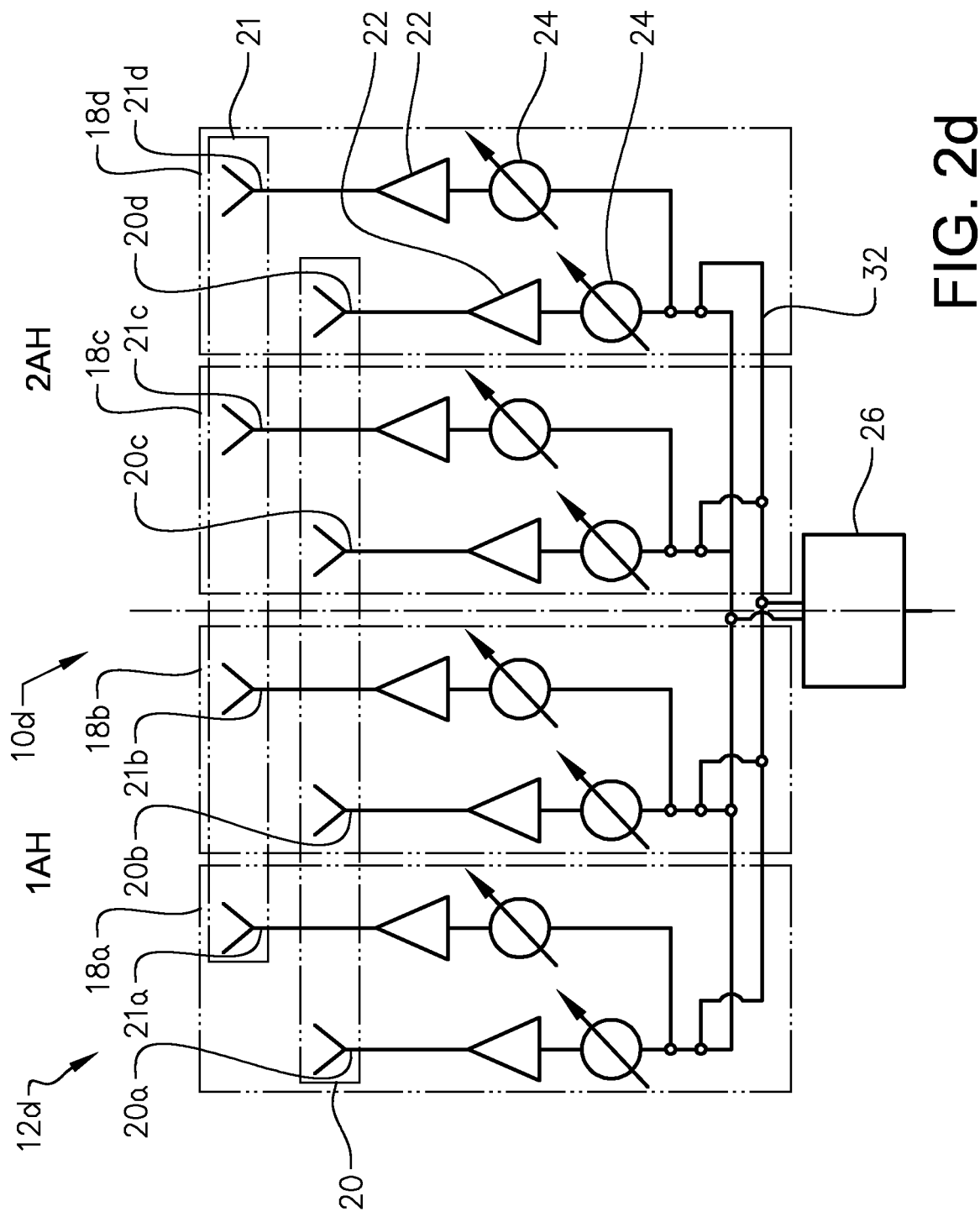
Figure 2E:
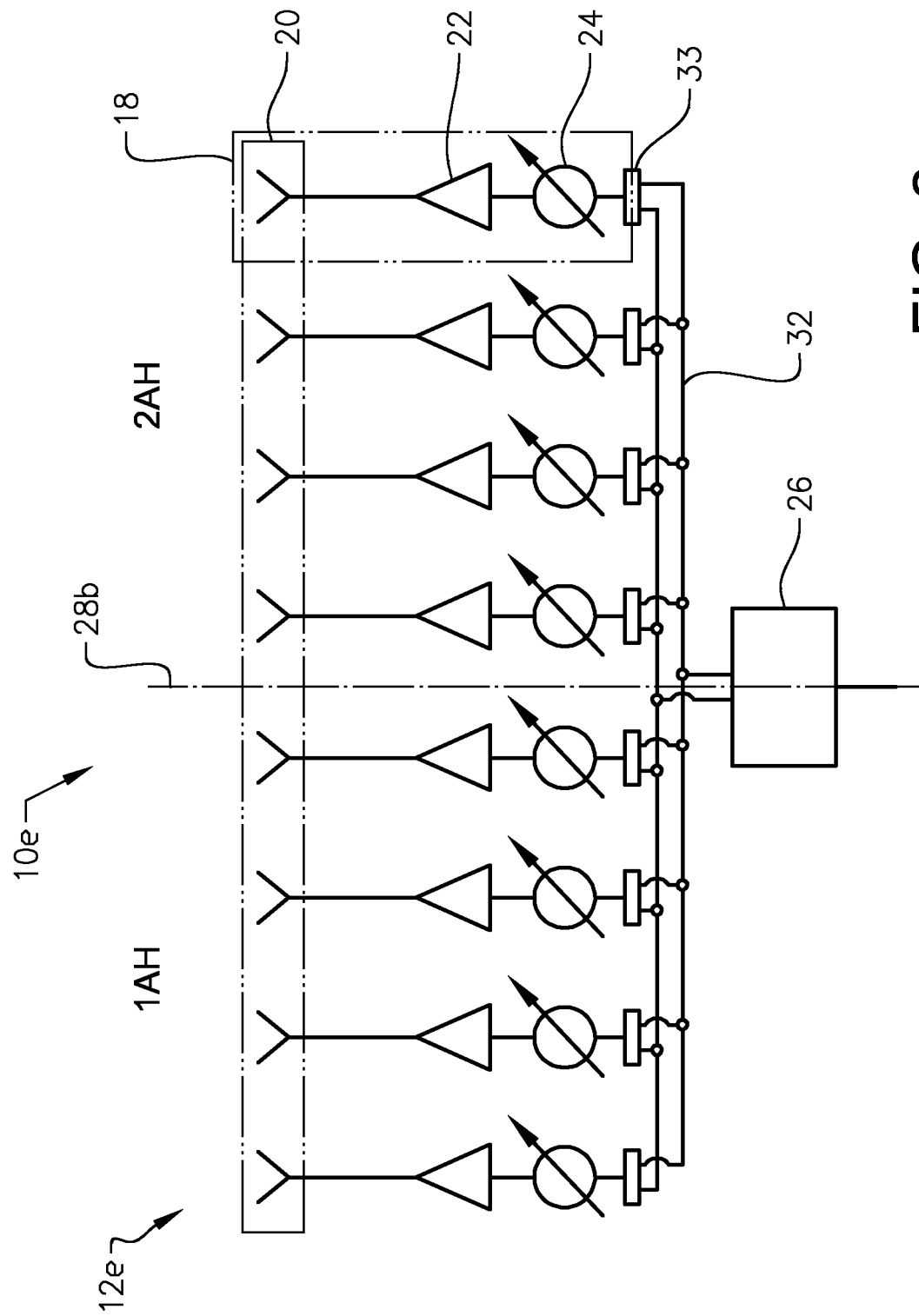

Further exemplary embodiments of electronically steerable antenna system 10c, 10d and 10e are disclosed in FIGS. 2c, 2d and 2e. The method of the present invention of forming an ISLS control signal by applying a first and a second transmission phase offset by using phase shifters and/or a phase control distribution network, apply also for the exemplary embodiments of electronically steerable antenna systems 10c, 10d and 10e of FIGS. 2c, 2d and 2e.

FIG. 2c discloses a schematic view of a third exemplary embodiment of an electronically steerable antenna system 10c. According to the third exemplary embodiment disclosed in FIG. 2c the electronically steerable antenna system 10c comprises an antenna 12c in turn comprising sixteen antenna elements 20, 21, wherein the antenna elements 20, 21 are arranged in eight antenna columns 18. According to the third exemplary embodiment disclosed in FIG. 2c respective antenna column 18 comprises two antenna elements 20, 21. Further, in the exemplary embodiment disclosed in FIG. 2c the first and second transmission phase offsets are obtained by means of a phase shifter 24 of respective antenna column 18.

Thus, all antenna elements 20, 21 of an antenna column 18 have the same transmission phase.

For all embodiments disclosed herein, the electronically steerable antenna system may also comprise an uneven number of antenna columns, but when transmitting an ISLS control signal only an even number of, in relation the centerline of the antenna symmetrically arranged, antenna columns are active, thus used for transmission.

According to other exemplary embodiments each antenna element of respective antenna column is provided with a phase shifter each. Also, as is apparent for a person skilled in the art, for certain embodiments providing respective antenna element with an amplifier may not be necessary.

Such exemplary embodiment is disclosed FIG. 2d, disclosing a fourth schematic view of an embodiment of an electronically steerable antenna system 10d. The electronically steerable antenna system 10d of FIG. 2d comprises four antenna columns 18 (18a, 18b, 18c, 18d), with eight antenna elements 20 (20a, 20b, 20c, 20d) and 21 (21a, 21b, 21c, 21d). The ISLS control signal is obtained by using a phase control distribution network 32 in accordance with the embodiment of FIG. 2b.

Referring now to FIG. 2e, disclosing a schematic view of a fifth embodiment of an electronically steerable antenna system 10e, disclosing yet further variations of how electronically steerable antenna systems 10 of the present invention may be configured. The exemplary electronically steerable antenna system 10e of FIG. 2e discloses yet an embodiment where the ISLS control signal is obtained by using a phase control distribution network 32 in accordance with the embodiment of FIG. 2b. In the embodiment of FIG. 2e the antenna 12e comprises eight antenna columns 18 with one antenna element 20 each.

Figure 3:
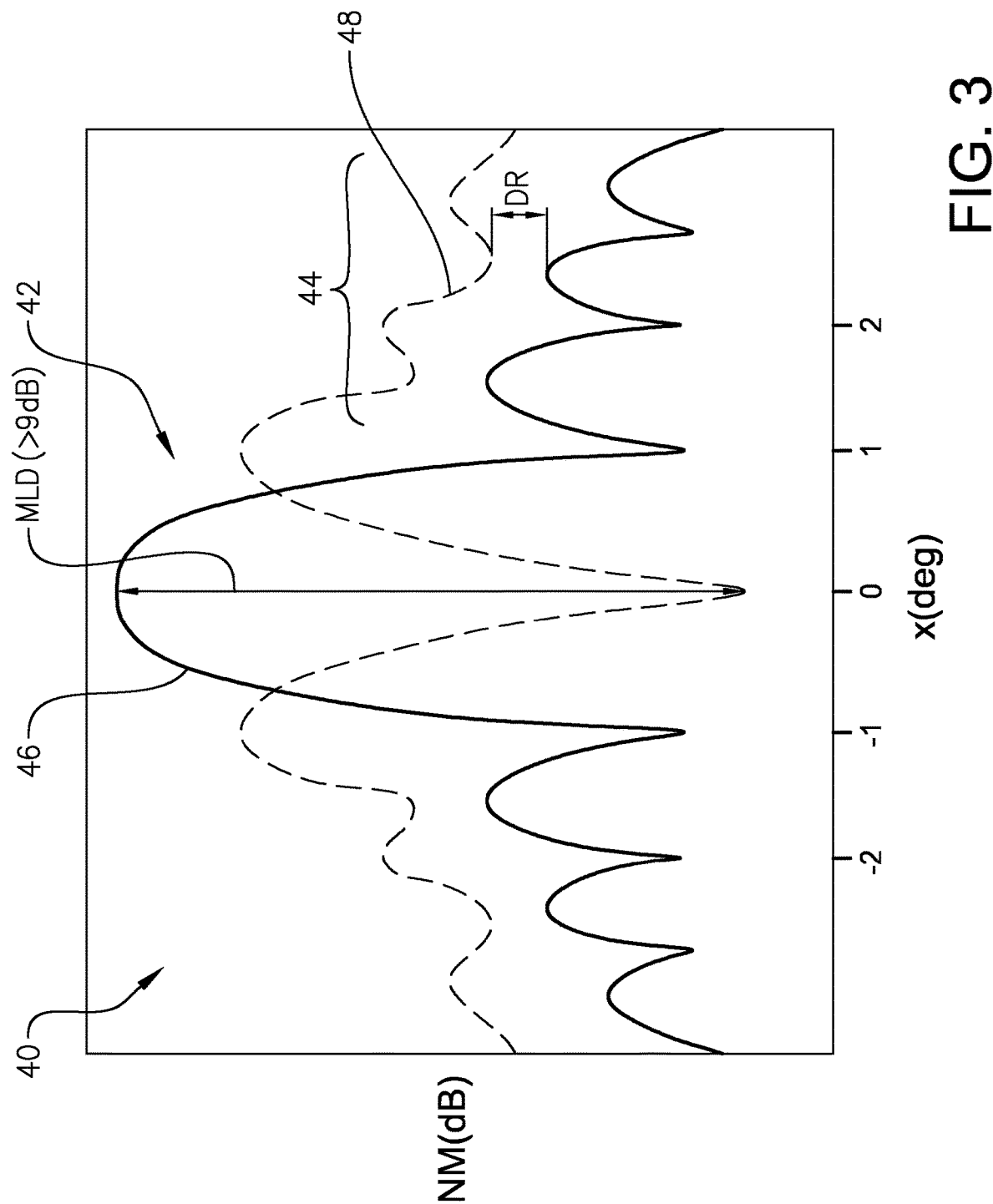

FIG. 3 discloses a schematic antenna diagram 40, provided for further clarification of the present invention. In the schematic antenna diagram 40 normalized magnitude of effective radiated power, specified in dB, is shown on the y axis and angle, specified in degrees, is shown on the x axis. In FIG. 3 the main lobe 42 and side lobes 44 of an interrogation signal antenna pattern 46 are shown together with an ISLS control signal antenna pattern 48.

According to the present invention, in order to determine the first transmission phase offset the difference in effective radiated power between the level of effective radiated power of a transmitted interrogation signal antenna pattern 46 and the level of effective radiated power of a subsequently transmitted ISLS control signal antenna pattern 48 should be maximized such that the difference become as large as possible at the angle where the difference currently is the smallest. This is indicated by a difference ratio, DR, in FIG. 3.

In FIG. 3 also a difference between the interrogation signal antenna pattern 46 and the ISLS control signal antenna pattern 48 in the direction of the main lobe 42 is indicated, MLD. According to mentioned prevailing standards such as e.g. STANAG 4193 or ICAO the level of effective radiated power between the interrogation signal antenna pattern 46 and the ISLS control signal antenna pattern 48 in the direction of the main lobe 42 should be at least 9 dB.

When herein using reference signs indexed with a letter what is referred to is an exemplary embodiment of a feature that may be configured differently according to the present invention. Thus, e.g. 10 refers to electronically steerable antenna systems according to the present invention whereas 10*a*, 10*b*, 10*c*, 10*d* and 10*e* refers to various exemplary embodiments of according to the present invention.

The invention claimed is:

1. A method for controlling an electronically steerable antenna system (10) comprising a signal generator (26) configured to generate electromagnetic waveforms and an antenna comprising an even number of antenna columns (18) symmetrically arranged about a centerline of the antenna (28) and thereby forming two symmetrical antenna halves (1AH, 2AH), wherein each respective antenna column (18) comprises at least one antenna element (20) configured for transmitting electromagnetic waves, the method comprising the steps of:
forming an interrogator side lobe suppression (ISLS) control signal by:
(i) generating an electromagnetic waveform, and
(ii) distributing the generated electromagnetic waveform to the antenna elements (20) of the antenna columns (18), wherein the antenna columns (18) form antenna column pairs (18*a*-18*d*, 18*b*-18*c*), wherein the antenna column pairs (18*a*-18*d*, 18*b*-18*c*) are formed by one antenna column (18*a*, 18*b*) from the first antenna half (1AH) and one antenna column (18*c*, 18*d*) of the second antenna half (1AH), wherein the antenna columns (18) of an antenna column pair (18*a*-18*d*, 18*b*-18*c*) are equally distanced from the centerline (28) of the antenna,
during distribution of the electromagnetic waveform to the antenna elements (20):
(i) applying a first transmission phase offset to the electromagnetic waveform distributed to the antenna elements (20) of each antenna column pair (18*a*-18*d*, 18*b*-18*c*), wherein the first transmission phase offset determines the phase offset between each antenna column pair (18*a*-18*d*, 18*b*-18*c*), and
(ii) applying a second transmission phase offset to each antenna column (18) of the second antenna half (2AH), wherein the second transmission phase offset of the second antenna half (2AH) offset is 180 degrees in relation to the first antenna half (1AH), and
after the first and the second phase offsets have been applied, transmitting the generated electromagnetic waveform as the ISLS control signal by means of the antenna elements (20) of the electronically steerable antenna system (10).

2. A method for controlling an electronically steerable antenna system (10) according to claim 1, wherein the method further comprises the step of calculating the first transmission phase offset, wherein the first transmission phase offset is calculated by maximizing the ratio in effective radiated power between the effective radiated power of the transmitted ISLS control signal and the effective radiated power of a transmitted interrogation signal in the directions of side lobes.

3. A method for controlling an electronically steerable antenna system (10) according to claim 1, wherein:
the electromagnetic waveforms generated by the signal generator (26) are distributed to the antenna columns (18) via an electromagnetic phase control distribution network (32), and
the steps of applying the first and second transmission phase offsets occur by means of configuring the electromagnetic phase control distribution network (32) such that the first and second transmission phase offsets are obtained.

4. A method for controlling an electronically steerable antenna system (10) according to claim 3, wherein:
the electromagnetic phase control distribution network (32) comprises a number of conductive lines, and
the configuration of the electromagnetic phase control distribution network (32) is obtained by configuring the properties of the conductive lines such that the first and second transmission phase offsets are obtained.

5. A method for controlling an electronically steerable antenna system (10) according to claim 1, wherein:
a respective antenna element (20) is provided with a phase shifter (24) configured to control the phase of at least transmitted electromagnetic waves of respective antenna element (20), and
the steps of applying the first and second transmission phase offsets further involve configuring the phase shifters (24) of the antenna elements (20) of the antenna columns (18) such that the first and second transmission phase offsets are obtained.

6. The method for controlling an electronically steerable antenna system (10) according to claim 1, wherein the antenna columns (18) comprise at least four antenna columns.

7. The method for controlling an electronically steerable antenna system (10) according to claim 1, wherein each antenna column (18) comprises a plurality of the antenna elements (20), and each of the plurality of antenna elements (20) of one antenna column (18) are configured for transmitting electromagnetic waves with the same transmitting phase.

8. An electronically steerable antenna system (10), wherein the electronically steerable antenna system (10) comprises:
a signal generator (26) configured to generate electromagnetic waveforms, and
an antenna comprising an even number of antenna columns (18) symmetrically arranged about a centerline of the antenna (28) and thereby forming two symmetrical antenna halves (1AH, 2AH),
wherein:
each respective antenna column (18) comprises at least one antenna element (20) configured at least for transmitting electromagnetic waves, and
the electronically steerable antenna system (10) is configured to:
form an interrogator side lobe suppression (ISLS) control signal by:
(i) generating one or more electromagnetic waveforms, and
(ii) distributing the one or more generated electromagnetic waveforms to the antenna elements (20) of the antenna columns (18), wherein the antenna columns (18) form antenna column pairs (18*a*-18*d*, 18*b*-18*c*), wherein the antenna column pairs (18*a*-18*d*, 18*b*-18*c*) are formed by one antenna column (18*a*, 18*b*) from the first antenna half (1AH) and one antenna column (18c, 18d) of the second antenna half (1AH), wherein the antenna columns (18) of an antenna column pair (18a-18d, 18b-18c) are equally distanced from the centerline (28) of the antenna, during distribution of the one or more electromagnetic waveforms to the antenna elements (20):

(i) apply a first transmission phase offset to the electromagnetic waveform distributed to the antenna elements (20) of each antenna column pair (18a-18d, 18b-18c), wherein the first transmission phase offset determines the phase offset between each antenna column pair (18a-18d, 18b-18c), and (ii) apply a second transmission phase offset to each antenna column (18) of the second antenna half (2AH), wherein the second transmission phase offset of the second antenna half (2AH) offset is 180 degrees in relation to the first antenna half (1AH), and after the first and the second phase offsets have been applied, transmit the generated electromagnetic waveform as the ISLS control signal by means of the antenna elements (20) of the electronically steerable antenna system (10).

9. An electronically steerable antenna system (10) according to claim 8, comprising at least four antenna columns (18).

10. An electronically steerable antenna system (10) according to claim 8, wherein:

each antenna column (18) comprises a number of antenna elements (20), and all antenna elements (20) of one antenna column (18) are configured for transmitting electromagnetic waves with the same transmitting phase.

11. A non-transitory computer-readable medium having instructions stored thereon, which, when executed by a processor of a computer, cause the computer to:

form an interrogator side lobe suppression (ISLS) control signal by controlling a signal generator to generate one or more electromagnetic waveforms via a signal generator (26);

during distribution of the one or more electromagnetic waveforms to antenna elements (20) of antenna columns (18) of an antenna, the antenna columns (18) being symmetrically arranged about a centerline (28) of the antenna and thereby forming two symmetrical antennal halves (1AH, 2AH), wherein the antenna columns (18) form antenna column pairs (18a-18d, 18b-18c), wherein the antenna column pairs (18a-18d, 18b-18c) are formed by one antenna column (18a, 18b) from the first antenna half (1AH) and one antenna column (18c, 18d) of the second antenna half (1AH), wherein the antenna columns (18) of an antenna column pair (18a-18d, 18b-18c) are equally distanced from the centerline (28) of the antenna:

(i) apply a first transmission phase offset to the electromagnetic waveform distributed to the antenna elements (20) of each antenna column pair (18a-18d, 18b-18c), wherein the first transmission phase offset determines the phase offset between each antenna column pair (18a-18d, 18b-18c), and (ii) apply a second transmission phase offset to each antenna column (18) of the second antenna half (2AH), wherein the second transmission phase offset of the second antenna half (2AH) offset is 180 degrees in relation to the first antenna half (1AH), and after the first and the second phase offsets have been applied, transmit the generated electromagnetic waveform as the ISLS control signal by means of the antenna elements (20) of the electronically steerable antenna system (10).

12. The non-transitory computer-readable medium according to claim 11, wherein the instructions, when executed by the processor, further cause the computer to calculate the first transmission phase offset, wherein the first transmission phase offset is calculated by maximizing the ratio in effective radiated power between the effective radiated power of the transmitted ISLS control signal and the effective radiated power of a transmitted interrogation signal in the directions of side lobes.

13. The non-transitory computer-readable medium according to claim 11, wherein:

the electromagnetic waveforms generated by the signal generator (26) are distributed to the antenna columns (18) via an electromagnetic phase control distribution network (32), and the application of the first and second transmission phase offsets occurs by configuring the electromagnetic phase control distribution network (32) such that the first and second transmission phase offsets are obtained.

14. The non-transitory computer-readable medium according to claim 13, wherein:

the electromagnetic phase control distribution network (32) comprises a number of conductive lines, and the configuration of the electromagnetic phase control distribution network (32) is obtained by configuring the properties of the conductive lines such that the first and second transmission phase offsets are obtained.

15. The non-transitory computer-readable medium according to claim 11, wherein the antenna columns (18) comprise at least four antenna columns.

16. The non-transitory computer-readable medium according to claim 11, wherein each antenna column (18) comprises a plurality of the antenna elements (20), and each of the plurality of antenna elements (20) of one antenna column (18) are configured for transmitting electromagnetic waves with the same transmitting phase.

* * * * *